(12) United States Patent
Smith et al.

(10) Patent No.: US 8,783,732 B2
(45) Date of Patent: Jul. 22, 2014

(54) FLUID CONNECTOR WITH HOSE CUTTING BLADES

(75) Inventors: Scott A. Smith, Toledo, OH (US);
Michael P. Wells, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 334 days.

(21) Appl. No.: 12/977,445

(22) Filed: Dec. 23, 2010

(65) Prior Publication Data
US 2012/0161437 A1 Jun. 28, 2012

(51) Int. Cl.
*F16L 33/00* (2006.01)

(52) U.S. Cl.
USPC .......................................... 285/259; 285/256

(58) Field of Classification Search
USPC .................... 285/222.2, 222.4, 258, 259, 256
See application file for complete search history.

(56) References Cited

U.S. PATENT DOCUMENTS

| | | | | |
|---|---|---|---|---|
| 216,851 | A * | 6/1879 | Hofmann | 285/238 |
| 589,216 | A * | 8/1897 | McKee | 285/239 |
| 1,847,218 | A * | 3/1932 | Lamb | 285/222.3 |
| 1,996,855 | A | 4/1935 | Cheswright | |
| 2,228,018 | A * | 1/1941 | Scholtes | 285/222.4 |
| 2,237,490 | A * | 4/1941 | Knowland | 285/222.4 |
| 2,268,142 | A * | 12/1941 | Lusher et al. | 285/258 |
| 2,371,971 | A * | 3/1945 | Main et al. | 285/259 |
| 2,572,645 | A * | 10/1951 | Melsom | 285/222.4 |
| 2,661,225 | A * | 12/1953 | Lyon | 285/222.4 |
| 2,731,279 | A * | 1/1956 | Main, Jr. | 285/95 |
| 2,797,111 | A * | 6/1957 | Beazley | 285/222.4 |
| 2,816,781 | A * | 12/1957 | Woodling | 285/222.4 |
| 2,865,094 | A * | 12/1958 | Press | 29/506 |
| 3,127,672 | A * | 4/1964 | Kretschmer | 29/450 |
| 3,189,370 | A * | 6/1965 | Marshail | 285/27 |
| 3,287,033 | A * | 11/1966 | Currie | 285/40 |
| 3,381,981 | A * | 5/1968 | Wilson | 285/222.4 |
| 3,423,109 | A | 1/1969 | New et al. | |
| 3,495,855 | A * | 2/1970 | Currie | 285/253 |
| 3,684,319 | A | 8/1972 | Samartina | |
| 3,990,728 | A * | 11/1976 | Coughlin | 285/40 |
| 4,111,469 | A * | 9/1978 | Kavick | 285/256 |
| 4,293,150 | A * | 10/1981 | Press | 285/222.4 |
| 4,366,841 | A * | 1/1983 | Currie et al. | 138/109 |

(Continued)

FOREIGN PATENT DOCUMENTS

DE 4139742 A1 6/1993
WO WO-2006113952 A1 11/2006

OTHER PUBLICATIONS

International Search Report PCT/US2011/066430, dated Mar. 26, 2012.

*Primary Examiner* — Aaron Dunwoody
(74) *Attorney, Agent, or Firm* — Rader, Fishman & Grauer PLLC

(57) ABSTRACT

An electrically conductive hose cutting clip has at least one cutting blade that is shaped to provide a cutting edge for penetration of the inner layer(s) of a multiple layer fluid conveyance hose when it is clipped onto a fluid connector and the hose is installed on the fluid connector by forcing it onto the connector. The cutting action by the cutting blade provides for a relatively low resistance electrical connection between an electrically conductive layer of the hose and the fluid connector. This can be used to provide a signal path from a sensing element on the hose to a system electronic component.

17 Claims, 3 Drawing Sheets

(56) References Cited

U.S. PATENT DOCUMENTS

| | | |
|---|---|---|
| 4,405,969 A | 9/1983 | Swavely |
| 4,477,108 A * | 10/1984 | Castelbaum et al. ...... 285/222.4 |
| 4,522,435 A * | 6/1985 | Miller et al. ................... 285/256 |
| 4,666,191 A * | 5/1987 | Sotelo et al. ................ 285/222.2 |
| 4,675,780 A * | 6/1987 | Barnes et al. ................. 361/215 |
| 4,926,909 A | 5/1990 | Salinas |
| 5,207,460 A | 5/1993 | Oetiker |
| 5,288,109 A * | 2/1994 | Auberon et al. ............ 285/222.4 |
| 5,382,059 A * | 1/1995 | Wilson .......................... 285/256 |
| 5,487,570 A * | 1/1996 | Wilson .......................... 285/256 |
| 5,607,191 A * | 3/1997 | Wilson .......................... 285/256 |
| 5,671,953 A * | 9/1997 | Brewis et al. ................. 285/258 |
| 7,080,860 B2 * | 7/2006 | Takagi et al. ................. 285/256 |
| 7,159,905 B1 * | 1/2007 | Stark et al. ....................... 285/41 |
| 2006/0196252 A1 | 9/2006 | Deckard |
| 2010/0007325 A1 | 1/2010 | Stark |

\* cited by examiner

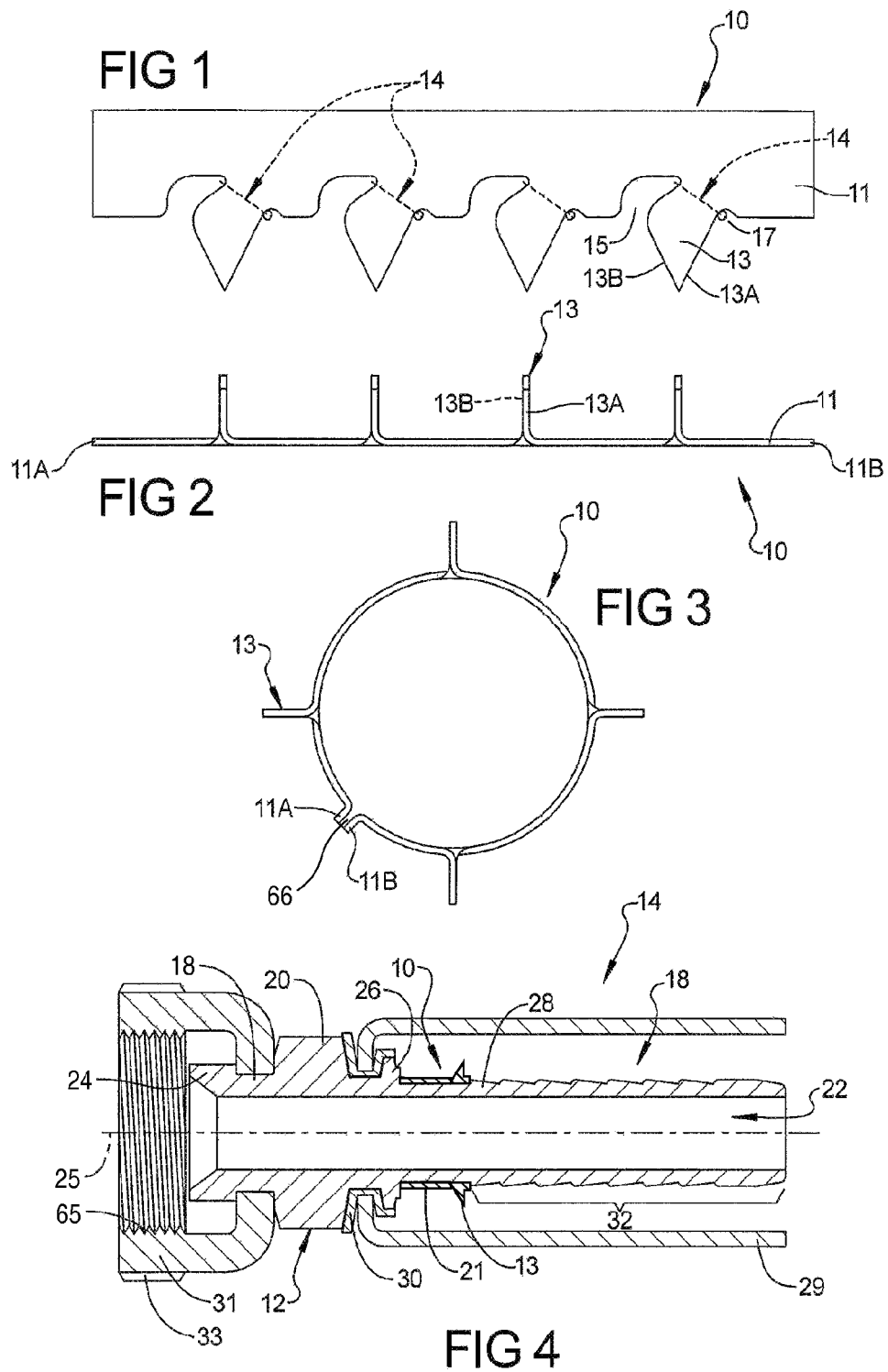

FLUID CONNECTOR WITH HOSE CUTTING BLADES

RELATED APPLICATIONS

The present application relates to application U.S. Ser. No. 2012/0161434, entitled Fluid Connector with a Hose Cutting Clip and to application U.S. Ser. No. 2012/0160536 entitled Fluid Connector With Hose Cutting Ring, both of which were filed on the same day as this application.

BACKGROUND

Traditionally, a hose that is to be connected to a system device such as a hydraulic pump is first connected to some type of hose fitting such as a fluid connector having a barbed nipple. The fluid connector is then typically connected to some type of device such as a pump or valve block using a coupling nut. As the hose is forced over the barbs on the nipple, the barbs apply a retaining force by displacing the inner layer of the hose outward without cutting that inner layer. If there is a need for an electrical connection between an electrically conductive intermediate layer of the hose and an electronic system, then a jumper wire is required to be routed from the electrically conductive intermediate layer to the fluid connector or directly to the electronic system or to some type of fluid device to which the fluid connector is attached. These prior art electrical jumpers are unreliable and are expensive to assemble and are susceptible to damage either during assembly or during operation.

SUMMARY

The present disclosure describes a fluid connector that includes a hose cutting clip that has at least one sharp cutting blade that extends from a clip body. In one embodiment, the hose cutting clip has at least one sharp cutting blade that extends from the clip body although it is contemplated that at least two cutting blades will be used in the exemplary fluid connector. The hose cutting blades provide a cutting function when a fluid conveyance hose, having a pliable layer which covers an electrically conductive layer, is installed onto the fluid connector. The inner layer of the hose is cut by the cutting blades so that there is an electrical path from the intermediate electrically conductive layer of the hose to the fluid connector and finally to the device to which the fluid connector is attached or, in the alternative, directly from the fluid connector to an electrical circuit. The hose cutting clip of this disclosure is particularly suitable for use in conjunction with a hose that incorporates some type of sensing element in the hose and the signal generated by the sensor must be carried by the electrically conductive layer of the hose through a fluid fitting or connector to a device where it is made available for use by other control or diagnostic systems. The hose cutting clip has at least one sharp cut tab or blade that extends from the body of the clip. This hose cutting clip provides a cutting function when the hose is fully installed onto the fluid connector such that the inner layer of a hose is cut by at least one of the cutting blades so that there is an electrical path from the intermediate electrically conductive layer of the hose to a fluid connector and finally to the device to which the fluid connector is connected or from the fluid connector directly to an electronic circuit such as an electronic diagnostic or control system. The hose cutting clip of this disclosure is can be used with a hose that incorporates some type of sensing element in the hose such as a life sensing hose which generates a signal that must be carried by the conductive layer of the hose to a device where it is made available for use to monitor hose life or system pressures by other control or diagnostic systems. The conductive layer of the hose is usually a steel braid, spiral wound or knitted layer.

Also disclosed is another embodiment where a connector socket that has cutting tabs extending inwardly is used with hoses having a second electrically conductive layer and an intermediate non-conductive layer that separates the first conductive layer from the second conductive layer. The cutting tabs which extend inwardly from an inside surface of a hose socket and cut into the outer layer of the hose and penetrate down to touch and slightly deform the second conductive layer. This completes the electrically conductive path from the second conductive layer to the socket. The socket is electrically insulated from the connector body by an insulator collar. In the case where higher fluid pressures need to be handled by the fluid connector and attached hose, this type of a crimped socket can be used to apply additional clamping force on the outside of the hose over the hose nipple.

BRIEF DESCRIPTION OF THE DRAWINGS

FIG. 1 is a top plan view of the exemplary hose cutting clip;

FIG. 2 is an end plan view of the hose cutting clip of FIG. 1 with the cutting blades bent upward;

FIG. 3 is an end plan view of the hose cutting clip of FIG. 2 with the cutting clip bent to final form;

FIG. 4 is a cross-sectional view of a fluid connector assembly having the exemplary hose cutting clip of FIG. 3 installed;

DETAILED DESCRIPTION

Figure 5:
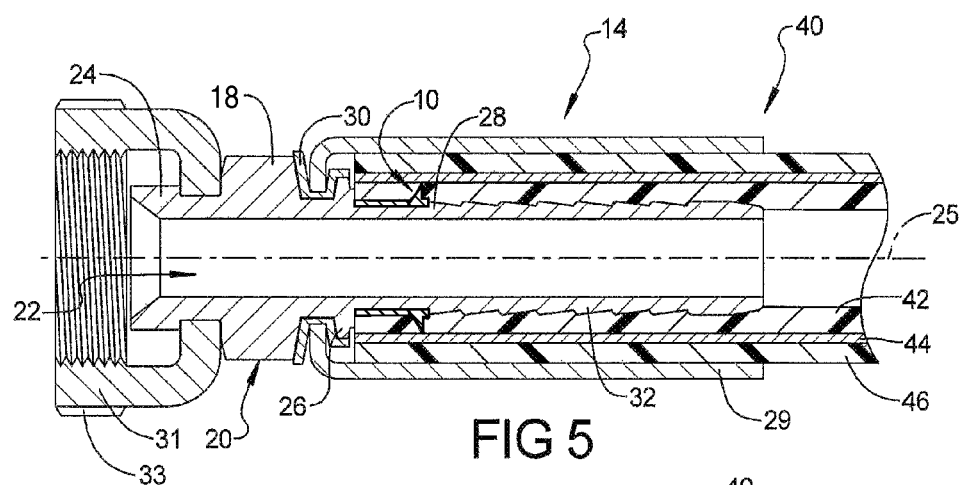
FIG. 5 is a cross-sectional view of the fluid connector assembly of FIG. 4 with a fluid conveyance hose installed.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a top plan view of the exemplary hose cutting clip 10 is shown. The cutting blades 13 extend from the base 11 of the hose cutting clip 10 and lay flat prior to a bending operation. Thus, the hose cutting clip 10 can be stamped from a flat piece of metal such as steel.

The cutting blades 13 have a front edge 13A and a back edge 13B. At the base of the front edge 13A is a small aperture 17 and at the base of the back edge 13B is a large aperture 15. The absolute and relative diameters of the large aperture 15 and the small aperture 17 can be varied depending on a variety of factors such as materials, geometry and size of the elements. The cutting blades 13 are shown generally as triangular in shape but other shapes such as rounded could be used depending on a variety of factors. The tip of the cutting blades 13 can be pointed or rounded or square or any other suitable shape.

The clip base 11 can be of the same material thickness as the cutting blades 13 or the cutting blades 13 can be thinner than the thickness of the material used for the base 11. Another variation involves making the front and/or back edge 13A, 13B sharp by shaping the metal of the cutting tab 13 to form one or two sharp edges. As few as one cutting blade 13 can be used to cut the inner layer 42 (see FIG. 5) of a layered hose 40 and make electrical contact with the hose conductive layer 44. Bend lines 14 are used in a subsequent forming operation.

Now referring to FIG. 2 of the drawings, a plan end view of the exemplary hose cutting clip 10 is shown with the cutting blades 13 bent at an approximate 90 degree angle to the clip base 11. The cutting blades 13 are initially bent to a 90 degree angle to the clip base 11 along bend lines 14. Then the cutting blades 13 are twisted so that they are aligned as close as possible to the centerline 24 of the fluid connector 18. The objective is to bend the cutting blades 13 so that the cut tab 13 will slice through the inner layer 42 of the hose 40. The front edge 13A of the cutting blades 13 is fully shown in the front plan view of FIG. 2 and the base edge of the rear edge 13B is shown.

Now referring to FIG. 3 of the drawings, the end view of the exemplary hose cutting clip 10 of FIG. 2 is shown with the cutting clip 10 bent into a circular ring shape for installation on the fluid connector 18. A first end 11A of the clip base 11 is bent to almost meet the second end 11B of the clip base 11. A gap 66 is shown between the first and second ends 11A, 11B. Upon installation of the cutting clip 10 on the fluid connector 18, the gap 66 is increased in width until the first and second ends 11A and 11B are far enough apart to allow the cutting clip 10 to be slipped onto the fluid connector 18 at the clip holding section 21. The cutting clip 10 is then released onto the clip holding section 21 of the fluid connector 18.

Now referring to FIGS. 4&5 of the drawings, cross-sectional views of the fluid connector 18 are shown. Upon installation of the cutting clip 10 on the fluid connector 18, the gap 66 is increased in width until the first and second ends 11A and 11B are far enough apart to allow the cutting clip 10 to be slipped onto the fluid connector 18 at the clip holding section 21. The cutting clip 10 is then released on to the clip holding section 21 of the fluid connector 18.

The cutting blades 13 extend radially from the clip holding section 21 a sufficient distance to cut the inner layer 42 of the hose 40 and then make electrical contact with the conductive layer 44. The exemplary hose cutting clip 10 has a clip body 11 and relatively sharp cutting blades 13 that extend outwardly from the clip body 11. The cutting clip 10 as shown in FIG. 3 is installed on the body 12 of the fluid connector 18. The clip body 11 is spring loaded and securely engages the fluid connector 18 by being expanded and then is allowed to retract over the body 12 of the fluid connector 18. With reference to FIG. 5, the hose cutting clip 10 provides a cutting function when the inner layer 42 of the hose 40 is cut by the cutting blades 13 so that the cutting blades 13 make contact with the intermediate electrically conductive layer 44 of the hose 40 and there is an electrical path established from this intermediate conductive layer 44 of the hose 40 to the fluid connector 18 as shown in FIG. 4 and finally to the device to which the fluid connector 18 is attached such as to a hydraulic pump, motor, valve body, etc. or directly to an electronic circuit. The hose cutting clip 10 of this disclosure is particularly suitable for use in conjunction with a hose that incorporates some type of sensing element in the hose to generate a signal which must be carried by the conductive layer 44 of the hose 40 through the fluid connector 18 to an electrical circuit where it is made available for use by a control or diagnostic system.

Figure 8:
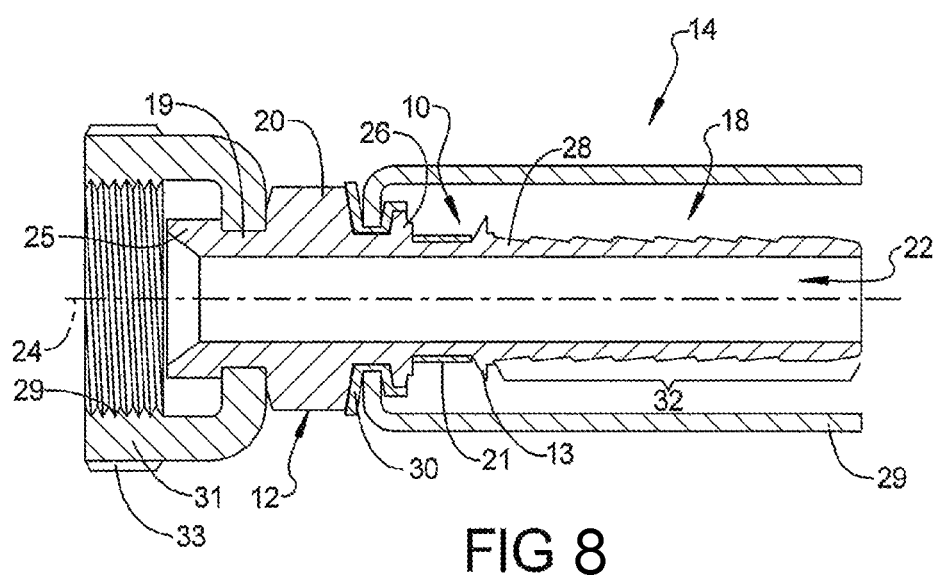
FIG. 8 is a cross-sectional view of a fluid connector assembly having the cutting blades formed as an integral part of the body of the fluid connector.

The cutting clip 10 can be removably or permanently attached to the body 12 of the fluid connector 18 or alternately, the cutting blades 13 can be formed as an integral part of the body 12 of the fluid connector 18 as shown in FIG. 8. In that configuration, one or more of the cutting blades 13 would extend from the body 12 to cut the inner layer 42 of the hose 40 and electrically engage the conductive intermediate layer 44.

The fluid connector 18 has a hex nut 20 which is fashioned to be engaged by a tool such as a wrench to hold the fluid connector 18 from rotating as the coupler nut 31 is tightened to a mating threaded fitting on a fluid device such as a pump or valve body. It is understood that other attachment methods may be used to connect the fluid connector 18 to a pump or valve body or other fluid device. A central passageway 22 formed along a central axis 25 of the fluid connector 18 provides a path to allow a pressurized fluid to flow there through. A circumferential intermediate flange 26 extends outwardly from the body of the fluid connector 18 and positions the insulating collar 36. Also shown is the hose socket 29 which is mounted on the flange 26 with the insulating collar 36 positioned between the hose socket 29 and the flange 26 if electrical insulation is needed between the socket 29 and the fluid connector 18. This is typically the case when the outside layer 46 of the hose 40 is skived and a hose conductive layer is allowed to make electrical contact with the socket 29 with a subsequent electrical connection to an electronic circuit. Generally, the hose socket 29 is an optional part that is used for use with the handling of higher pressure fluids. It should be noted, if a socket 29 is used and no electrical insulation is required, then the insulating collar 36 can be eliminated. The coupling nut 31 is used to attach the fluid connector 18 to another fluid handling device such as a pump or valve body. The intermediate flange 26 locates the cutting clip 10 at one side of the clip body 11 while a first barb 28 serves to locate the other side of the cutting clip 10 on the clip holding section 21 of the fluid connector 18.

A chamfered section 24 is formed to engage a mating element formed in a hydraulic device such as a pump body to provide a sealed path for the fluid. The coupling nut 31 is threaded on the internal face of the coupling nut 31. The threads 65 engage mating threads formed in the pump body or other hydraulic device where the coupling nut 31 can be rotated and tightened to the hydraulic device by hex section 33 to draw the chamfered section 24 into the mating element of the hydraulic device.

Figure 6:
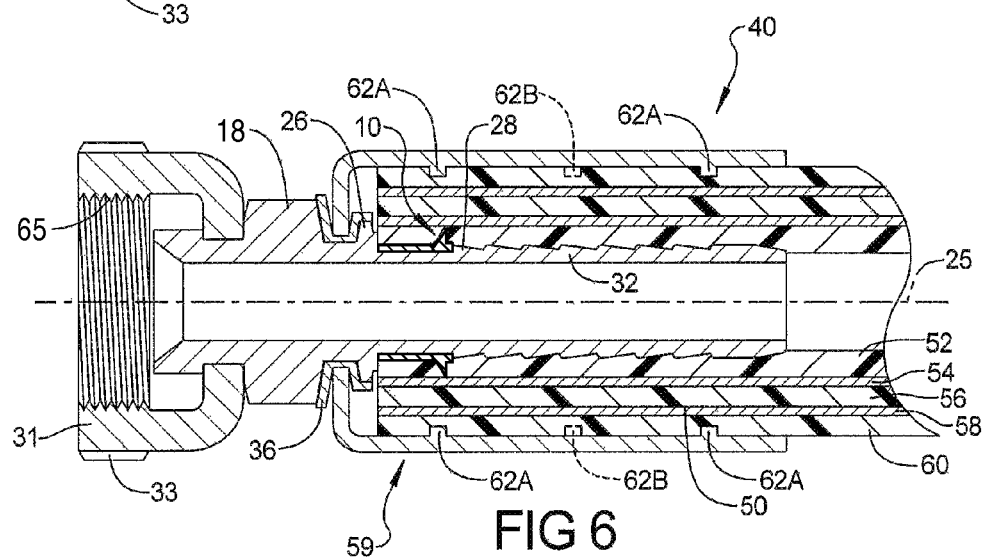
FIG. 6 is a cross-sectional view of an alternate embodiment of an exemplary fluid connector with a multi-layer hose installed.

Attached to the coupling body 11 at the insulating collar 36 is a hose socket 29. The hose socket 29 is supported on the insulating collar 36 and surrounds and is crimped to the hose 40. The hose socket 29 is crimped onto the hose to provide a clamping force on the hose 40 to force it against the nipple 32. The insulating collar 36 can locate and hold a prior art type of socket 29 having a smooth inner surface if it used with a hose only having a single conductive layer, or the socket 59 can have cutting tabs 41 as shown in FIG. 6 if it is to be used with a hose 40 having at least two conductive layers. The version of the connector socket 29 is shown in FIG. 4 as a smooth bore version of connector socket 29. With this version, if it is desired to have electrical conduction between the hose conductive layer 44 and the socket, then the outer layer 46 of hose 40 can be skived off so that the inner surface of the socket 29 makes contact with the conductive layer 44 of the hose 40.

The mating fluid conveyance hose 40 is retained on the fluid connector 18 by at least one barb such as first barb 28 or by a multiplicity of hose barbs denoted in FIGS. 4&5 as barbed nipple 32. The barbed nipple 32 of the fluid connector 18 makes up what is known in the art as the hose nipple of the fluid connector 18 and it is known to use the nipple to retain a fluid conveyance hose.

Now referring to FIG. 5 of the drawings, a cross-sectional view of the hose 40 fully installed on the fluid connector 18 is shown. Clearly shown is how at least one cutting blade 13 of the cutting clip 10 has cut through the hose inner layer 42 to extend and make mechanical and electrical contact with the electrically conductive layer 44 thereby establishing a secure electrical path from the electrically conductive layer 44 to the cutting clip 10 and to the fluid connector 18. This type of hose connection device is used to provide conduction of an electrical signal representing a hose performance state or internal fluid pressure to some type of electronic circuitry.

The exemplary cutting clip 10 has a clip body 11 and two relatively sharp cutting blades 13 that extend outwardly from the clip body 11. The cutting clip 10 is installed on the body of the fluid connector 18. The clip body 11 is spring loaded and securely engages the fluid connector 18 by being expanded and then contracts over the clip body 11 of the fluid connector 18. The hose cutting clip 10 provides a cutting function when the inner layer 42 of the hose 40 is cut by the cutting blades 13 to touch the inner electrically conductive layer 42 of the hose 40 and there is an electrical path established from this inner conductive layer 42 of the hose 40 to the fluid connector 18 and finally to the device to which the fluid connector 18 is attached such as to a hydraulic pump, motor, valve body, etc. or directly to the electronic circuit of a diagnostic or control system. The hose cutting clip 10 of this disclosure is particularly suitable for use in a hose 40 that incorporates some type of sensing element in the hose 40 such as a life sensing hose which generates an electrical signal which must be carried by the hose through a fluid connector 18 to a device where it is made available for use by a control or diagnostic system.

The fluid connector 18 has a hex nut 20 which is fashioned to be engaged by a tightening tool such as a wrench to hold the fluid connector 18 from rotating as the fluid connector 18 is attached to some type of hydraulic device such as a pump. The coupling nut 31 is rotated to tighten the chamfer coupling 24 to a mating surface on the hydraulic device. The internal threads 65 engage mating threads formed on the hydraulic (or pneumatic) device when the coupling nut 31 is rotated by the nut hex 33. A central passageway 22 formed along a central axis 25 of the fluid connector 18 provides a flow path to allow a pressurized fluid to flow there through. A circumferential intermediate flange 26 extends outwardly from the body 12 of the fluid connector 18 and helps to position the insulating collar 36. The intermediate flange 26 locates the cutting clip 10 at one side of the clip body 11 while a first barb 28 serves to locate the other side of the cutting clip 10 on the clip body 11.

The mating hose is retained on the fluid connector 18 by at least one barb such as first barb 28 or by a multiplicity of hose barbs donated in FIGS. 4&5 as barbed section 32. The barbed section 32 of the fluid connector 18 makes up what is known as the nipple of the fluid connector 18.

The hose 40 is shown as being made of an inner layer 42, an electrically conductive intermediate layer 44 and a wear resistant outer layer 46. It should be noted that any number of layers beyond an inner layer 42 and an intermediate conductive layer 44 can be used for the hose. The inner layer 42 can be made of a PTFE or rubber or other chemically impervious material and can consist of more than one layer while the intermediate layer 44 is usually a braided or spiral or knitted steel wire although other electrically conductive material or configuration could be used such as a foil or carbon fiber. Then other hose layers can be added as required for a specific application.

If the hose 40 has at least a first conductive layer 44 and it is desired to make an electrical connection between the conductive layer 44 and the hose socket 29, then the outer layer 46 of the hose 40 can be skived to the conductive layer 44 so that the socket 29 having a smooth inner surface can contact the conductive layer 44 when it is crimped to the hose 40. This configuration would create an electrical path from the conductive layer 44 in the hose 40 to the hose socket 29. This electrical signal could then be used by a variety of electrical circuits.

If the hose 40 has both a first conductive layer 54 and a second conductive layer 58 as shown in conjunction with hose 50 in FIG. 6, then the first conductive layer 54 can be electrically connected to the cutting blades 13 of the cutting clip 10 and the second conductive layer 58 can be electrically connected to the socket 29 using the socket tabs 62A, 62B or by skiving the hose outer layer 60 to expose it to the socket 29 when it is crimped.

Now referring to FIG. 6, a cross-section of a multilayer hose 50 having two conductive layers 54, 58 fully installed on the exemplary fluid connector 18 is shown as fluid connector assembly 50. The hose 50 has an inner layer 52, a first conductive layer 54, an intermediate layer 56, a second conductive layer 58 and an outer protective layer 60. It should be noted that any number of hose layers could be utilized to get the desired hose characteristics.

A hose socket 59 is retained on the insulating collar and extends to partially cover the hose 50 after it is assembled to the hose coupling 18. The hose socket 59 is then crimped to a precise crush load on the hose 50. In FIG. 6, the socket 59 has not been subjected to final crimping. If it is desired to make electrical contact with the second conductive layer 58, then cutting tabs 62A, 62B are formed on the inside wall of the hose socket 59 where it covers the hose 50. When the socket 59 has gone through final crimping to the hose 50, the tabs 62A, 62B cut the protective outer layer 58 of the hose 50 and extend to make contact with the second conductive layer 58. Prior to final crimping of the socket 59, the cutting tabs 62A, 62B extend to partially cut into the outer layer 60 of the hose 50. After the socket 59 is fully crimped, the cutting tabs 62A and 62B cut through the outer layer 60 of the hose 50 to touch and press against the outer conductive layer 58. The socket 59 is electrically insulated from the connector body 12 by the insulating collar 30.

To electrically connect the inner conductive layer 54 to the connector body 12 the cutting clip 10 of FIGS. 1-3 can be used as previously discussed. That combination could be used to provide two separate electrical signals to a diagnostic or control system. Any combination of the cutting blades 13 and the alternate socket 59 having the cutting tabs 62A, 62B or the prior art socket 29 with a skived hose could be used to provide electrical signals from a hose such as a life sensing hose to a diagnostic device or other electronic circuitry. Any combination of the hoses 40, 50 and the hose sockets 29, 59 could be used to conduct the electric signals carried by one or more conductive layers 44, 54, 58 of the hose 40, 50.

Figure 7:
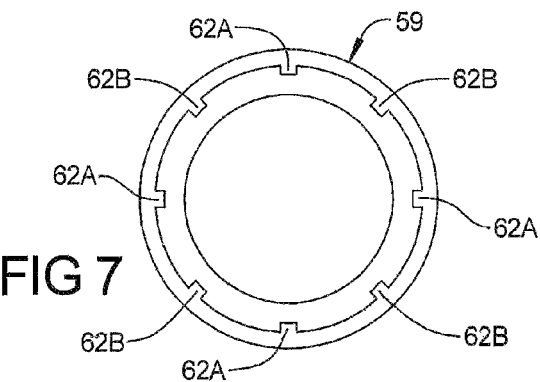
FIG. 7 is an end view of the hose socket of FIG. 6.

Now referring to FIG. 7, an end view of the socket 59 is shown. The cutting tabs 62A and 62B are clearly shown extending form the inner surface of the socket 59. After a full crimp is applied on the socket 59, the cutting tabs 62A and 62B will cut through the outer layer 60 of the hose 50 and establish electrical contact with the outer conductive layer 58.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. A method of providing electrical connection between a hose conductive layer and a fluid coupling body comprising:
    providing a fluid coupling body;
    providing a spring loaded cutting clip having a cutting end;
    attaching said cutting clip to said coupling body, the cutting clip securely engaging the fluid coupling body by selectively expanding and retracting over the coupling body;
    providing a hose having inner layer, an outer layer, and an intermediate conductive layer; and
    installing said hose on said fluid coupling such that said cutting end cuts into said hose inner layer and makes electrical contact with said conductive layer of said hose.

2. A method of providing electrical connection between a hose conductive layer and a fluid coupling body comprising:
    providing a coupling body;
    providing a cutting clip having a cutting end;
    attaching said cutting clip to said coupling body;
    providing a hose having an inner layer and a first conductive layer and an intermediate layer and a second conductive layer; and
    installing said hose on said fluid coupling such that said cutting end cuts into said hose inner layer and makes electrical contact with said first conductive layer of said hose, said intermediate layer minimizing electrical contact between said first conductive layer of said hose and said second conductive layer of said hose.

3. A method of providing electrical connection between a hose conductive layer and a fluid coupling body comprising:
    providing a coupling body;
    providing a cutting clip having a cutting end;
    attaching said cutting clip to said coupling body;
    providing a hose having an inner layer and a first conductive layer and an intermediate layer and a second conductive layer and an outer layer, said intermediate layer minimizing electrical contact between said first conductive layer and said second conductive layer of said hose;
    installing said hose on said fluid coupling such that said cutting end cuts into said hose inner layer and makes electrical contact with said first conductive layer of said hose;
    providing a hose socket mounted on said coupling body, said hose socket having cutting tabs extending inwardly therefrom; and
    crimping said hose socket to said hose thereby causing said cutting tabs to penetrate said hose outer layer and extending to make electrical contact with said second conductive layer.

4. The method of providing electrical connection of claim 1, further comprising providing an insulating collar between a hose socket and a flange of said fluid coupling body to provide electrical insulation between said hose socket and said fluid coupling body.

5. The method of providing electrical connection of claim 1, wherein providing said cutting clip comprises stamping a piece of metal to form said cutting clip.

6. The method of providing electrical connection of claim 5, further comprising bending said cutting end to a 90 degree angle with respect to a clip base.

7. The method of providing electrical connection of claim 6, further comprising twisting said cutting end such that said cutting end is aligned with a center line of said fluid coupling body.

8. The method of providing electrical connection of claim 1, further comprising bending said cutting clip into a circular ring shape that is configured for installation on said fluid coupling body.

9. The method of providing electrical connection of claim 1, further comprising providing a chamfered section on said fluid coupling body, and engaging said chamfered section to a mating element on a hydraulic device to provide a sealed path for fluid received from the hydraulic device.

10. The method of providing electrical connection of claim 2, further comprising providing an insulating collar between a hose socket and a flange of said fluid coupling body to provide electrical insulation between said hose socket and said fluid coupling body.

11. The method of providing electrical connection of claim 3, further comprising providing a socket uninterruptedly mounted directly to said fluid coupling body so as to electrically connect said socket to said fluid coupling body.

12. The method of providing electrical connection of claim 3, further comprising providing an insulating collar between a hose socket and a flange of said fluid coupling body to provide electrical insulation between said hose socket and said fluid coupling body.

13. The method of providing electrical connection of claim 3, wherein providing said cutting clip comprises stamping a piece of metal to form said cutting clip.

14. The method of providing electrical connection of claim 13, further comprising bending said cutting end to at least approximately a right angle with respect to a clip base.

15. The method of providing electrical connection of claim 14, further comprising twisting said cutting end such that said cutting end is aligned with a center line of said fluid coupling body.

16. The method of providing electrical connection of claim 3, further comprising bending said cutting clip into a circular ring shape that is configured for installation on said fluid coupling body.

17. The method of providing electrical connection of claim 3, further comprising providing a chamfered section on said fluid coupling body, and engaging said chamfered section to a mating element on a hydraulic device to provide a sealed path for fluid received from the hydraulic device.

* * * * *